(12) United States Patent
Gartstein et al.

(10) Patent No.: US 7,379,206 B2
(45) Date of Patent: May 27, 2008

(54) METHODS AND SYSTEMS FOR DETERMINING RESOURCE CAPABILITIES FOR A LEAN PRODUCTION ENVIRONMENT

(75) Inventors: Yuri Gartstein, Richardson, TX (US); Daniel E. Viassolo, Schenectady, NY (US)

(73) Assignee: Xerox Corporation, Norwalk, CT (US)

( * ) Notice: Subject to any disclaimer, the term of this patent is extended or adjusted under 35 U.S.C. 154(b) by 926 days.

(21) Appl. No.: 10/756,210

(22) Filed: Jan. 12, 2004

(65) Prior Publication Data

US 2005/0151993 A1    Jul. 14, 2005

(51) Int. Cl.
*G06K 15/00* (2006.01)
(52) U.S. Cl. .................. 358/1.9; 358/3.27; 399/24
(58) Field of Classification Search .............. 358/1.15, 358/1.13, 2.1, 468, 1.9, 3.27; 709/221, 223; 399/24
See application file for complete search history.

(56) References Cited

U.S. PATENT DOCUMENTS

| | | | | |
|---|---|---|---|---|
| 5,220,674 | A | * | 6/1993 | Morgan et al. ............. 709/223 |
| 5,452,218 | A | * | 9/1995 | Tucker et al. ............... 700/110 |
| 5,995,721 | A | | 11/1999 | Rourke et al. ............. 395/114 |
| 6,230,271 | B1 | | 5/2001 | Wadlow et al. ............. 713/201 |
| 6,393,320 | B2 | | 5/2002 | Lasersohn ....................... 707/9 |
| 6,449,255 | B1 | * | 9/2002 | Waclawsky ................. 370/236 |
| 2002/0124765 | A1 | | 9/2002 | Hansen ....................... 101/484 |
| 2002/0141764 | A1 | * | 10/2002 | Harper et al. .................. 399/24 |
| 2003/0088651 | A1 | * | 5/2003 | Wilson ........................ 709/221 |
| 2003/0169446 | A1 | * | 9/2003 | Grohs et al. ............... 358/1.15 |
| 2003/0223092 | A1 | * | 12/2003 | Caffary et al. ............. 358/1.15 |
| 2005/0012951 | A1 | * | 1/2005 | Madril et al. .............. 358/1.13 |
| 2005/0151993 | A1 | * | 7/2005 | Gartstein et al. .......... 358/1.15 |
| 2007/0263242 | A1 | * | 11/2007 | Takahashi .................. 358/1.14 |
| 2008/0037057 | A1 | * | 2/2008 | Caffary ....................... 358/1.15 |

\* cited by examiner

*Primary Examiner*—Jerome Grant, II
(74) *Attorney, Agent, or Firm*—Kermit D. Lopez; Luis M. Ortiz; Ortiz & Lopez, PLLC

(57) ABSTRACT

A plurality of printing jobs associated with a printing environment can be initially evaluated. Such a printing environment can be implemented as a print shop or another lean document production environment. A set of minimal resource capacities can then be calculated as a multi-objective optimization using a linear programming (LP) analysis. Alternatively, in a generalized geometrical algorithm, at least one peak-demand production rate associated with the most critical resource can first be estimated, in response to evaluating the plurality of printing jobs. Thereafter, minimal resource capacities of the plurality of resources of the printing environment can be hierarchically calculated based on estimating the previously determined peak-demand production rate of higher priority.

20 Claims, 6 Drawing Sheets

METHODS AND SYSTEMS FOR DETERMINING RESOURCE CAPABILITIES FOR A LEAN PRODUCTION ENVIRONMENT

TECHNICAL FIELD

Embodiments are generally related to lean production environments, including print shops and lean document production environments. Embodiments are also related to general linear programming (LP) and specific optimization algorithms. Embodiments are also related to methods and systems for evaluating production environments for optimization and efficiency as well as for designing lean environments. Embodiments are also related to methods and systems for controlling production rates in production environments with demand fluctuations.

BACKGROUND OF THE INVENTION

Print shops generally convert printing orders, also known as print jobs, into finished printed material. Conventional print shops are usually organized in a manner that is functionally independent of print job complexity, print job mix, and total volume of print jobs. Typically, related equipment is grouped together. Thus, all printing equipment is grouped and located in a single locale. Similarly, all finishing equipment is grouped and located in a single locale.

Conventional print shops organize resources into separate departments, wherein each department corresponds to a type of process or operation that is performed to complete a print job. When a print job arrives from a customer, the print job sequentially passes through each department. Once the print job is completely processed by a first department, the print job gets queued for the next department. This approach continues until the print job is completed.

The application of lean manufacturing concepts to print shop can drastically improve print shop efficiency. In the lean processing, print jobs quasi-continuously "flow" through the shop or through its production cells—small parts of the job that have been processed on a given workstation are moved for processing on next workstation without waiting for the remaining part of the job to be completed on the given workstation. In preparing print shops for lean document production, an important component is evaluation of the production rates required for customer jobs to be delivered on time.

A conventional calculation (i.e., of so called "takt-times") assumes that each job contributes to the demand rate uniformly within the time segment from the job arrival time through the time due. After summation over all jobs, the peaks of demand rates are used to estimate necessary resource capacities and current utilization. Depending on the job mix and demand fluctuations, the conventional calculation may lead to a substantial overestimation of the peak demand rates, and therefore of necessary capacities. These features are of a generic nature and can apply to any other lean production environment.

Additional complexity arises in the case of multiple resources, where a single resource capacity is not sufficient. Instead, a "family" of resources is utilized. When more than one resource is utilized, such resources can essentially "compete" against one another to satisfy the balanced lean workflow—decrease of one resource capacity can require increase of another resource capacity.

BRIEF SUMMARY

It is, therefore, a feature of the present invention to provide for an improved lean production environment, such, for example, as a print shop and/or lean document production environments.

It is another feature of the present invention to provide improved algorithms for use in evaluating print shops and lean document production environments and other lean production factories.

It is also a feature of the present invention to provide for methods and systems for evaluating lean production environments for optimization and efficiency thereof as well as for designing such environments.

It is also feature of the present invention to provide for methods and systems to control lean production environments with demand fluctuations.

Aspects of the present invention relate to methods and systems for determining minimal resource capacities in a printing environment. A plurality of printing jobs associated with a printing environment can be initially evaluated. Such a printing environment can be implemented as a print shop or another lean document production environment. A set of minimal resource capacities can then be calculated as a multi-objective optimization using a linear programming (LP) analysis. Alternatively, in a generalized geometrical algorithm, at least one peak-demand production rate associated with the most critical resource can first be estimated, in response to evaluating the plurality of printing jobs. Minimal resource capacities of the plurality of resources of the printing environment can be hierarchically calculated based on estimating previously determined peak-demand production rates of higher priority.

BRIEF DESCRIPTION OF THE DRAWINGS

The accompanying figures, in which like reference numerals refer to identical or functionally-similar elements throughout the separate views and which are incorporated in and form part of the specification further illustrate embodiments of the present invention

DETAILED DESCRIPTION OF THE INVENTION

The particular values and configurations discussed in these non-limiting examples can be varied and are cited merely to illustrate embodiments of the present invention and are not intended to limit the scope of the invention. By the same token, the term "print shop environment" and associated terminology are utilized herein merely as examples. The concepts and algorithms discussed herein with respect to embodiments are equally applicable to other products and production environments.

For purposes of the discussion below, a "print shop" can refer to a grouping of printing resources. A print shop may be a freestanding entity such as a commercial printer or may be part of a corporation or other entity. A "print job" generally refers to a logical unit of work that is to be completed for a customer. For example, a request to make 100 copies of a document constitutes a print job. Similarly, a request, for example, to print 1,000 copies of a book can constitute a print job.

Figure 1:
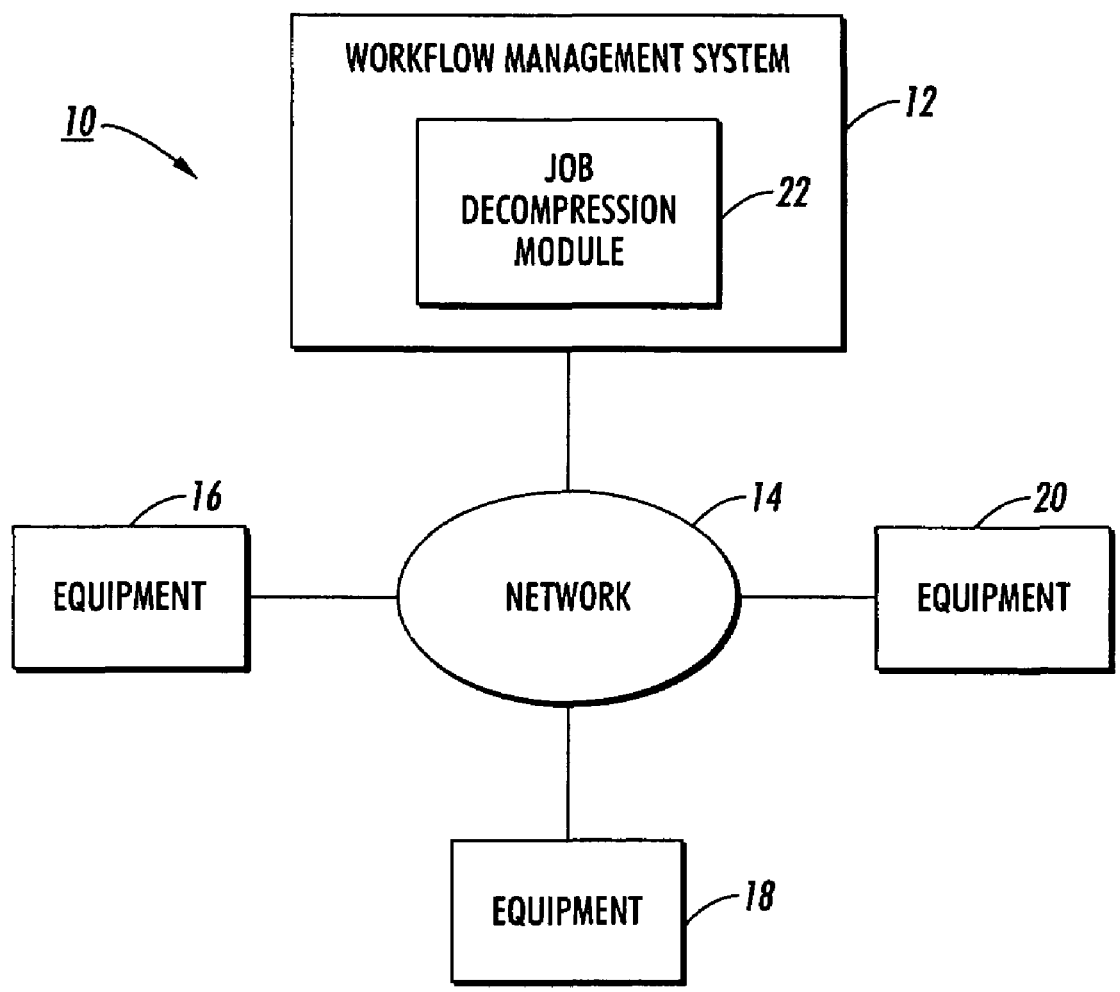
FIG. 1 illustrates an environment suitable for practicing the illustrative embodiment of the present invention.

FIG. 1 depicts an environment suitable for practicing the illustrative embodiment of the present invention. The printing environment 10 includes a workflow management system 12 that is responsible for managing workflow in the printing environment. The printing environment also includes equipment 16, 18 and 20 for completing the print job. The equipment may be of many different varieties. For example, the equipment may include a printer, a copier, a binder, a hole-punch, a collator, a sealer, a shrink-wrapper or any other variety of equipment that is used in completing and processing print jobs.

In the example depicted in FIG. 1, a network 14 interconnects the equipment 16, 18 and 20 with the workflow management system 12. Nevertheless, it can be appreciated that the present invention may also be practiced in environments where there is no network connection between the equipment and the workflow management system. The network 14 may be a local area network (LAN) or may, instead, be formed by communication links that interconnect the equipment 16, 18 and 20 and the workflow management system 12.

Those skilled in the art will appreciate that the depiction of FIG. 1 is intended to be merely illustrative and not limiting of the present invention. The print shop may have more than three pieces of equipment or even less than three pieces of equipment. Moreover, the workflow management system does not need to have a communication path with the equipment; rather the batches may be manually assigned based on the optional batch size information obtained by the workflow management system 12.

The workflow management system 12 may be implemented on a stand-alone computer system, such as the server computer system or a workstation. Alternatively, the workflow management system 12 may be integrated into the printing equipment, such as a printer, copier or the like. Still further, the workflow management system 12 may be implemented by distributing components that are realized as separate electronic devices. The workflow management system 12 includes a job decomposition module 22. The job decomposition module is responsible for decomposing print jobs into "batches." Not all print jobs need to be decomposed into batches. For example, if a customer wants a single copy of a document, the print job will likely not be partitioned into separate batches.

The job decomposition module 22 may be realized in software, firmware, or even hardware. The job decomposition module 22 may be run in a distributed fashion or in a tightly coupled fashion. Those skilled in the art will appreciate that there are multiple possible implementation for the job decomposition module 22. Embodiments can be implemented in the context of modules. In the computer programming arts, a module can be typically implemented as a collection of routines and data structures that performs particular tasks or implements a particular abstract data type.

Modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term module, as utilized herein generally refers to software modules or implementations thereof. Such modules can be utilized separately or together to form a program product that can be implemented through signal-bearing media, including transmission media and recordable media. An example of a suitable module includes the job decomposition module 22 illustrated in FIG. 1.

In general, consider n jobs (i=1, ..., n), each of which is described as $J_i=[q_i,t_{i1},t_{i2}]$ where $q_i$ is the amount/quantity of the single critical resource (e.g. of black-and-white impressions) required by the ith job, $t_{i1}$ the arrival time and $t_{i2}$ the time due for that job. The overall amount of the resource needed is $Q=\Sigma_i q_i$ and it has to be delivered between $t_1=\min\{t_{i1}\}$ and $t_2=\max\{t_{i2}\}$. The average demand production rate therefore is $\underline{R}=Q/(t_2-t_1)$. This average rate $\underline{R}$ constitutes the lower boundary on the required resource capacity: no matter what the job mix is, one cannot go below that rate. Of course, fluctuations of job arrivals may cause demand peaks well in excess of $\underline{R}$ and it may be necessary do determine the minimal value of R required to satisfy the demands of n jobs.

Depending on the jobs' pattern, relaxed solutions $R_r$ can be present with the maximum demand rates, which are lower than those of unrelaxed conventional solutions $R_u$: $\underline{R} \leq \max\{R_r\} \leq \max\{R_u\}$. Finding the "best" relaxed solutions is an optimization problem that can be formulated as follows: A formal definition of constraints can be designated, that $\{t_k (k=1, \ldots, m)\}$ comprises a set of all unique values among $\{t_{i1},t_{i2}\}$. The upper and lower boundaries can be defined as follows: $U_k=\Sigma_i q_i$, where $t_{i1}<t_k$ (sum over all jobs that could start before $t_k$), and $L_k=\Sigma_i q_i$, where $t_{i2} \leq t_k$ (sum over all jobs that must finish by $t_k$). At the end points: $U_0=L_0=0$ and $U_m=L_m=Q$, an (allowed) time-dependent (quantity) solution q(t) can be defined as a monotonous continuous function, such that $L_k \leq q(t_k) \leq U_k$. The corresponding rate solution is then as follows: R(t)=dq(t)/dt. In practice, piecewise solutions are typically implemented. The optimization problem is to find solution(s) q(t) that minimizes $\max\{R(t)\}$.

The following relaxation procedure generally describes an algorithm (i.e., which can be referred to as "geometric") that leads to "good" optimal solutions. In fact, in all numerous cases studied, the geometric algorithm yielded identical solution to found by the linear programming methods, but in a considerably shorter computational time. The algorithm seeks a piecewise solution and involves sequential application of the time segment [$t_a,t_b$] analysis with $q(t_a)=q_a$ and $q(t_b)=q_b$ fixed. The algorithm begins from the whole time span $t_a=t_1$ and $t_b=t_2$ and proceeds further on as necessary:

A determination can be made regarding whether or not a straight line, $q(t)=q_a+(q_b-q_a)/(t_b-t_a)$, is an allowed solution for all time moments $t_a \leq t_k \leq t_b$. If yes, this is an optimal solution for this segment. If not, the most critical point $t_k$ should be determined among those whose allowed windows did not accept the straight line. The most critical point is the one that has the steepest slope. The straight line, $t_k$ is associated with $q_k=U_k$ and the slope is $(q_b-U_k)/(t_b-t_k)$. Above the straight line, $t_k$ is associated with $q_k=L_k$ and the slope is $(L_k-q_a)/(t_k-t_a)$.

With the most critical point found, two new segments [$t_a$, $t_k$] and [$t_k$, $t_b$] can be formed whose ends are fixed respectively at [$q_a$, $q_k$] and [$q_k$, $q_b$]. The segment analysis for each of the segments can then be repeated. As a result of sequential application of the above procedure, an allowed solution will eventually be found that satisfies all the constraints and possesses "maximally uniform" resource utilization. In such a manner, the geometrical algorithm can completely and quickly solve the problem with a single critical resource.

The following simple example illustrates some basic ideas, notation and terminology when more than one critical resource is involved. Consider a print shop with 2 jobs: J1 and J2 that use 2 resources; e.g., a black-and-white printer and color printer. Each of these jobs Jj can be characterized by 4 numbers; i.e., Jj=[tj1, tj2, qj1, qj2], j=1,2. The variable tj1 represents the job arrival time. The variable tj2 represents the job due time. Similarly, the variable qj1 represents the quantity of resource 1 required by job Jj. Finally, the variable qj2 represents the quantity of resource 2 required by job Jj.

By way of a first example (1), assume that J1=[0, 10, 100, 150] and J2=[5, 15, 100, 50]. Our goal is to compute minimal resource capacities, or rates (e.g., measured in, for example, impressions/hour), that remain sufficient to produce jobs that are not late.

A conventional method of calculating "sufficient capacities" in a lean environment is takt-time analysis. This technique assumes that each job contributes to the demand rates uniformly within the time segment from job arrival through job due time, then adds demand rates over all jobs, and takes their peaks as the sufficient capacities. For instance, in the present example, demand rates for resource 1 are 100/(10−0)=10 for J1 during the time interval [0,10], and 100/(15−5)=10 for J2 during [5,15]. Therefore, the peak total demand rate becomes 20 (i.e., 10+10, for time period [5,10]). Similarly, for resource 2, the peak demand rate can be 20 (i.e., again during time period [5,10]). Thus, if resources 1 and 2 can deliver rates of 20, then neither J1 or J2 will be late (under an "adequate" production control policy). It can be seen, however, that these sufficient capacities are not necessary to produce no late jobs (i.e., rates below 20 can still provide jobs that are not late).

Figure 2:
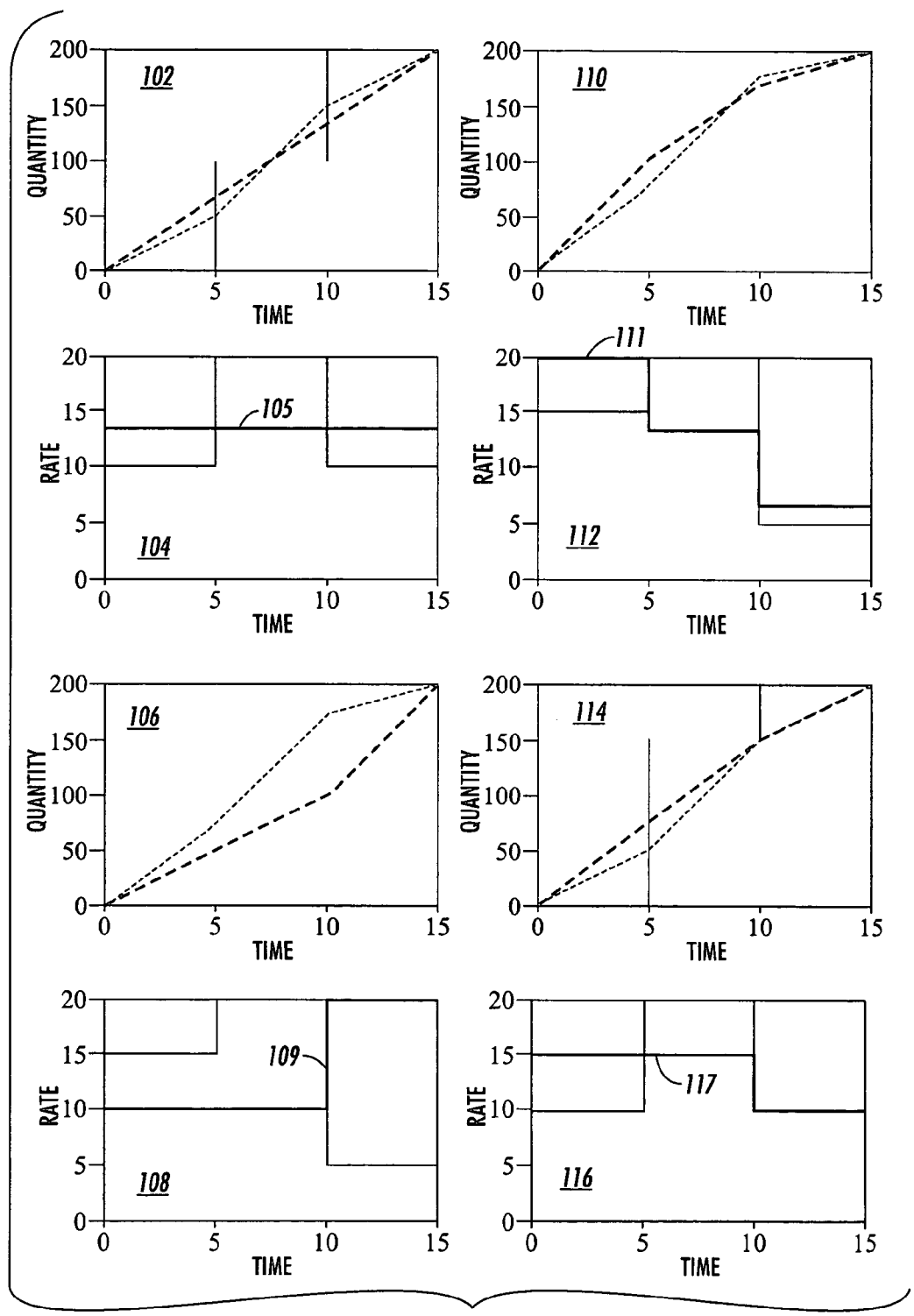
FIG. 2 illustrates a series of graphs comparing traditional takt-time solutions with the optimal minimal resource solution for two resources.

FIG. 2 illustrates a plurality of graphs 102-116, which depict the competition of resources. For the first 2 rows of FIG. 2, represented by graphs 102, 110 and 104, 112, an optimal (i.e., minimal) necessary capacity can be calculated for resource 1. Thereafter, given new constraints, a resulting optimal capacity for resource 2 can be generated. In this case, the necessary rate for resource 1 can be approximately 13.33, as indicated by line 105 of graph 104, and approximately 20 for resource 2 as indicated by line 111 of graph 112. The takt-time based rates are 20 for both resources as explained earlier.

The last 2 rows of FIG. 2, represented by graphs 106, 114 and 108, 116 illustrate the results of an inverted hierarchy wherein the necessary rate for resource 2 is initially optimized. The compatible necessary rate for resource 1 can then be computed, such that the necessary rates now become 20 and 15 for resources 1 and 2, as indicated respectively by line 109 of graph 108 and line 117 of graph 116.

It is clear that there is a trade off, wherein the lower the minimal rate for one of the resources, the larger the resulting minimal rate for the other resource. In fact, an entire family of pair rates describes this trade-off.

Figure 3:
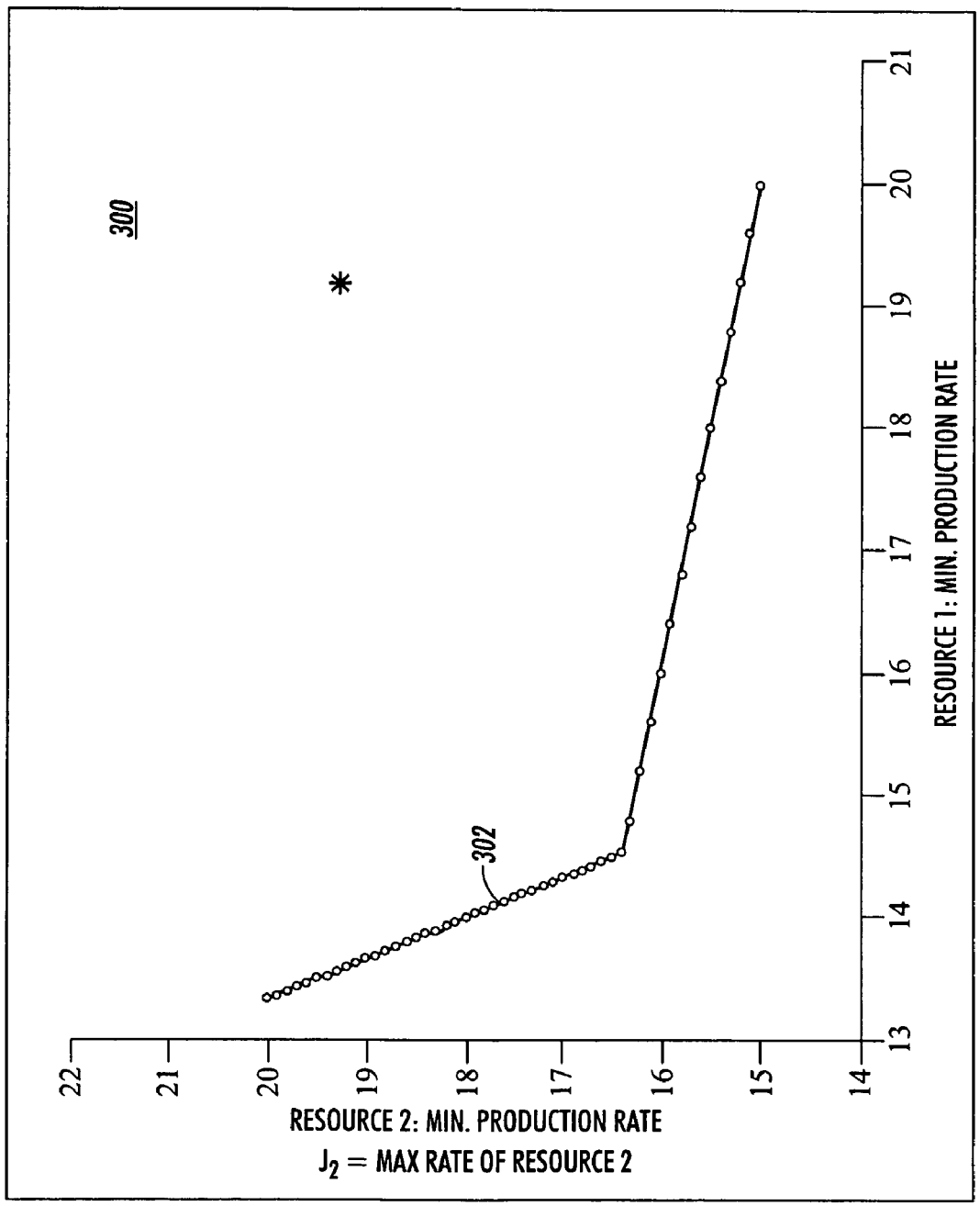
FIG. 3 illustrates a graph of a Pareto front, in accordance with an embodiment of the present invention.

FIG. 3 illustrates a graph 300 of a "Pareto front". A curve 302, as indicated in graph 300, represents this family of rates (known as the "Pareto front" in the multi-objective optimization literature). Notice that the extremes points of graph 300 are represented by the points (13.33, 20) and (20, 15) as indicated previously. The takt-time solution is marked with an asterisk in FIG. 3 and evidently requires larger resources. Both Pareto optimal and takt-time solutions assume a "balanced production," such that upon production of any given job, all resources required for this job are consumed continuously and proportionally.

A rigorous formulation of the multiple resource capacity optimization based on a given job mix as a linear programming problem can thus be set forth. Consider the general case of N jobs J1, J2, . . . , JN, that utilize M different resources. In this case, each job is defined by M+2 parameters as follows: Jj=[tj1, tj2, qj1, qj2, . . . , qjM], where tj1 is arrival time, tj2 is due time, and qjr is the quantity of resource r needed for job Jj, with r=1,2, . . . , M (qjr>=0). For a given set of N jobs, the time instants t1, t2, . . . , tm, can be defined such that any tk is either a job arrival or due time and tk+1>tk.

The performance cost Cr can also be defined, given by the peak rate for the resource r over all time intervals [t1, t2], (t2, t3], . . . , (t(m-1), tm] (restricted to rates that are constant over these intervals), or equivalently:

$$Cr=\max\{(qr(tk+1)-qr(tk))/(tk+1-tk), k=1,2, \ldots, m-1\},$$

where qr(tk) is the total quantity of resource r at time tk; (i.e. qr(tk)=q1r(tk)+q2r(tk)+ . . . +qNr(tk)). Of course, qjr(k)=0 in cases where job Jj is not active (not arrived or overdue) or when Jj does not use the resource r. The problem of minimizing the peak rate for resource 1 or C1 (e.g., a "1" value, without loss of generality), subject to the constraint of jobs being finished on time and balanced production can be cast as the following optimization problem:

minimize C1, subject to $$Lr(tk)<=qr(tk)<=Ur(tk), k=1,2, \ldots m, r=1,2, \ldots,$$
$$M \; qr(tk)=q1r(tk)+q2r(tk)+ \ldots +qM(tk),$$
$$k=1,2, \ldots m, r=1,2, \ldots, M; \; qjr(tk)=0 \text{ for}$$
$$\text{some j's } qjr(tk)=djr^*qj1(tk), r=2,3, \ldots, M,$$
$$j=1, \ldots, N$$

Lr(tk) represents the lower bound on the quantity of resource r at time tk; Lr(tk) can be computed as the sum of the quantities of resource r for all the jobs with due dates by time tk (jobs Jj with t2j<=tk). Ur(tk) represents the upper bound on the quantity of resource r at time tk. Ur(tk) can be computed as the sum of the quantities of resource r for all the jobs that arrived before time tk (jobs Jj with t1j<tk). Notice the extreme values: Lr(tm)=Ur(tm)=qr (total quantity of resource r over all jobs), and Lr(t1)=Ur(t1)=0. Also, qjr(tk) =0 for times tk where the job Jj is not active (i.e., not arrived or overdue), or for resources r that are not being used by Jj. Additionally, djr represents a job-dependent constant that is defined by: qjr(tk)=djr*qj1(tk), r=2,3, . . . , M (assume qj1(tk) not 0) and determines the "job structure", or relative amounts of different resources required by the job (under a balanced production)

The first row of constraints ensures that the necessary quantities are produced on time, and provides feasibility windows for the quantities qr(tk). For example, with reference to FIG. 2, vertical feasibility windows are shown. A second row of constraints ensures that the quantities for individual jobs are on time. The last row ensures that a balanced production is provided. It should be clear that the optimization variables are the resource quantities at all instants tk: qr(tk), and the resource quantities for each job at a given time tk: qjr(tk).

The optimization problem indicated above is an LP (Linear Programming) problem. To demonstrate this, all rates can be bounded with a new optimization variable, referred to as "gamma," which utilizes the fact that the variable $C1 \leq gamma \leq (q1(tk+1)-q1(tk))/(tk+1-tk) < gamma$, $k=1,2,\ldots, m-1$. LP problems can be solved via modern numerical methods, such as simplex, and the solutions obtained are globally optimal.

The solution to problem (1) provided above, or its minimizer, can provide an optimal value for the peak rate C1, but also some values for the other peak rates C2, C3, ..., CM. If desired, constraints can be added to these costs while still providing an LP problem. Such an observation means that it is possible to build a family of Pareto optimal solutions for the multi-objective optimization problem that arises if it is desired to minimize all peak rates C1, C2, ..., CM. In order to describe this problem in greater detail, assume an example with 2 resources (to keep the notation simpler). Therefore, only the costs C1 and C2 addressed. As Example (1) indicated above, with respect to FIGS. 2 and 3, illustrates that these 2 costs usually compete with one another.

Assume that the points corresponding to all the quantities that verify the constraints indicated above with respect to FIG. 1 can be plotted in the 2D cost space C1-C2. Regions of this 2D cost space that cannot be attained by any feasible rates are referred to generally as unachievable regions. The points on the boundary between achievable and unachievable regions can define the tradeoff surface, and correspond to Pareto optimal solutions. Given any Pareto solution, another solution for improving one of the costs cannot be found without degrading the other cost(s). Pareto solutions are worth computing because they provide limits of achievable performance. The following approach to solve multi-objective problems always produces Pareto solutions; moreover, all Pareto solutions can be found in the following manner:

minimize C1 subject to: C2<gamma and constraints of example (1).

Gamma is a scalar constant. To generate the curve of Pareto optimal solutions (i.e., also known as Pareto front), the LP optimization problem described above can be solved for different values of gamma. Gamma can be varied from large values to small values until the optimization becomes unfeasible. FIG. 3 illustrates the Pareto front for example (1). FIG. 3 indicates that the minimum gamma value is approximately 15.

In practice, the optimization cost can be frequently selected as the "total equipment cost". This equipment cost can be thought as a weighted combination of the peak rates of the resources, as represented by equation (1) below:

$$EquipCost:=w1*C1+w2*C2+w3*C3+\ldots \quad (1)$$

As indicated in equation (1), the variables w1, w2, etc., represent the prices per unit of the production rate of the respective resource. If the cost is replaced in example (1) above by this new cost EquipCost of equation (1), an LP problem still exists. Moreover, it is easy to see that the solution of this problem corresponds to one point on the Pareto curve. For instance, the "tip" of the Pareto front in FIG. 3 is the optimal solution for cases, wherein w1=w2; the points on the curve extremes solves the problem for either w1=0 or w2=0.

While the LP approach can provide an exact solution to the problem of multiple resources, it may demand a significant computation time for large-number-of-jobs problems. On the other hand, the geometric algorithm described above provides exact solutions for a single resource. A generalization of such an algorithm can now be considered for handling multiple resources. The generalization permits exact solutions to be obtained for the ends of the Pareto front and (approximate) good solutions for the interior points of the front, while remaining computationally very efficient.

A generalization includes a hierarchical application of a geometrical algorithm. Consider, for example, resources arranged in a predetermined order (i.e., most important resource first, then the next important resource, and so on). A geometrical algorithm can now be applied with respect to the first member of a hierarchy, that is, while disregarding other resources. A result can be an "absolute" minimal capacity of the most important resource.

Once this solution is obtained, it will imply new constraints for the allowed windows of other resources. The geometrical algorithm can then be applied to the next member of hierarchy with new constraints in place, and so forth. Each subsequent application with respect to the next resource will have modified allowed windows as consistent with all previously optimized resources. Various ends of the Pareto front correspond to various hierarchical arrangements of the resources. The end solutions are exact and coincide with the solutions obtained with the LP approach.

To derive (generally approximate) solutions for the interiors of the Pareto set, auxiliary resources can be introduced, which are linear combinations of the actual resources, and placed at the top of hierarchy. In this manner, one effectively parameterizes the sweeps of "quasi-Pareto" sets. For instance, for two resources q1 and q2, the auxiliary resource $q=\lambda\, q1+(1-\lambda)\, q2$ can be formed, where $0 \leq \lambda \leq 1$. The hierarchy {q,q1,q2} can then be solved, which is as expected, generally equivalent to the hierarchy {q,q2,q1}).

Similarly, for multiple resources, various linear combinations can be formed for use as higher members of the hierarchical solutions. For a much more regular behavior, normalized resources can be utilized to form linear combinations, so that each of the normalized resources varies within the same limits. It should be clear that a solution optimizing the values of such auxiliary resources corresponds to minimization of the objective function in equation (1) above.

A procedure for modification of allowed windows in the geometrical algorithm can be utilized as follows. Variables $0 \leq Sj \leq 1$ can be defined for each job j. A balanced production means that for each resource i at any moment of time t, the quantity of the resource consumed by job j is $q_{ji}(t)=S_j(t)\, q_{ji}$. Consider an allowed window for resource i at the time $t_k$. In such a case, a bare lower boundary $L0(i,t_k)$ can be determined by the sum of contributions from all the jobs that were due before or at the time $t_k$. A bare upper boundary $U0(i,t_k)$ can be determined by the sum of contributions from all the jobs that arrived before the time $t_k$. The term "bare" as utilized herein generally means that no new constraints from other resources are imposed (i.e., if this resource was at the top of hierarchy).

If the geometrical algorithm is applied and the optimal values $q_i(t_k)$ of the resource i determined at all times $t_k$, this is equivalent to the constraint (G1) below:

$$q_i(t_k)-L0(i,t_k)=\Sigma_{j=jk}S_j q_{ji} \quad (G1)$$

In constraint (G1), the summation is present only over the jobs j=jk that possess arrival times before $t_k$ and due times after $t_k$. With variable values $S_j$ satisfying constraint (G1), a function $f_m$ can immediately be constructed or another resource m, as indicated by constraint (G2) below:

$$f_m=\Sigma_{j=jk}S_j q_{jm} \quad (G2)$$

The minimum and maximum new boundaries of the allowed window for resource m can be determined according to constraint (G3) below $$L(m,t_k)=L0(m,t_k)+\min\{f_m\},\ U(m,t_k)=L0(m,t_k)+\max\{f_m\} \quad (G3)$$

At an arbitrary step of the hierarchical ladder, constraint or equation (G1) applies to all resources i that have already been optimized, while the constraints or equations (G2) and (G3) can be applied to all resources m that are to be optimized with new constraints in place. Evidently (G1-G3) constitutes a standard LP problem with respect to variables $S_j$ that is easily solvable by a standard simplex method.

Note a significant computational difference: here the LP problem is solved only for relatively few jobs that can cross the time boundary $t_k$ for each time $t_k$. On the other hand, the general LP approach to the multi-objective problem presented in an earlier section has to deal with all the jobs in the considered set simultaneously. The goodness of "geometrical solutions" also suggest their usefulness as starting points for the full LP approach, when exact solutions are sought.

Figure 4:
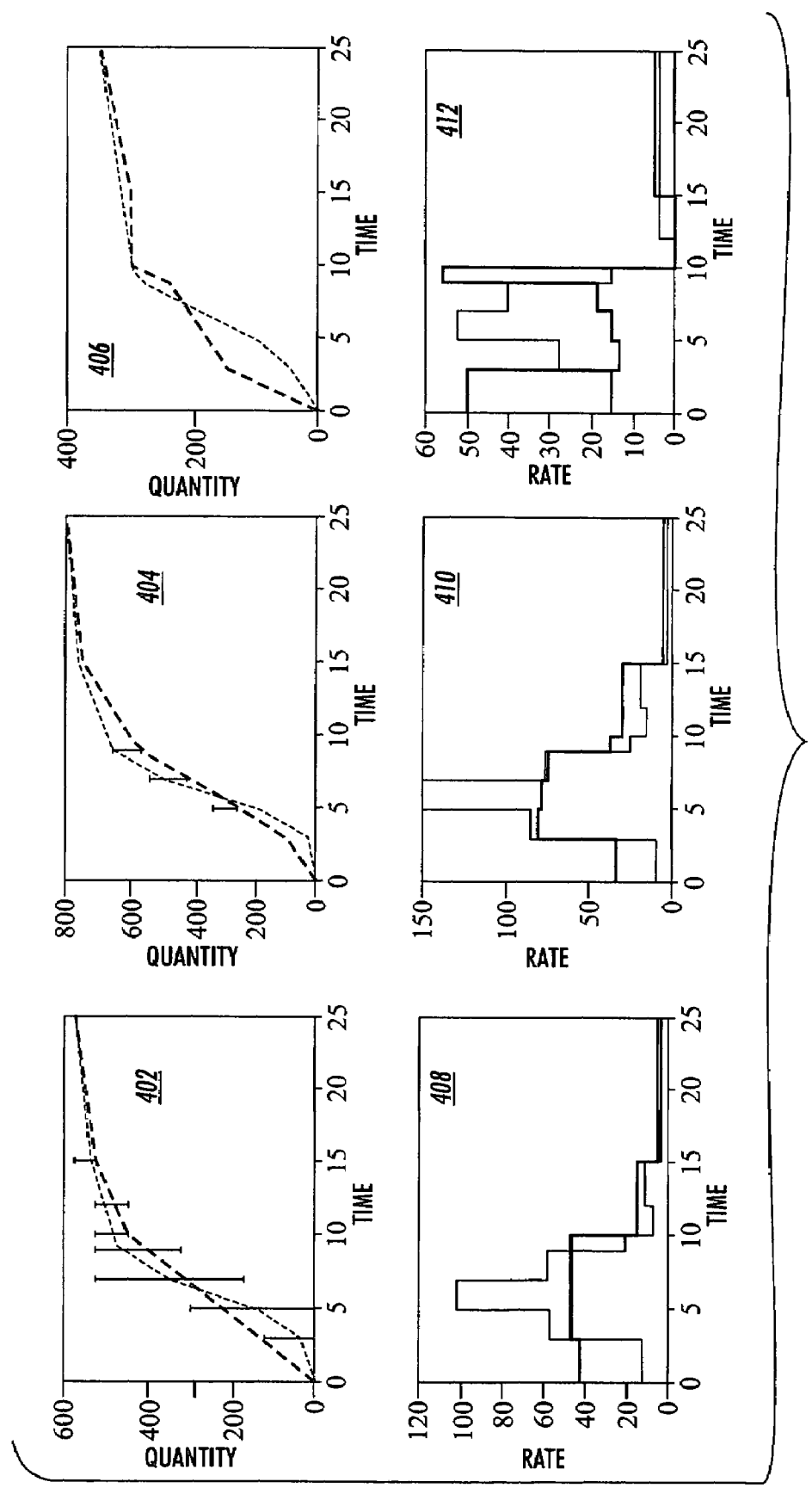
FIG. 4 illustrates a plurality of graphs illustrating hierarchical optimization, in accordance with an embodiment of the present invention.

A second example (2) can be considered. In this example (2), 5 jobs and 2 resources can be provided: J1=[0,10,100,150], J2=[5,15,150,0], J3=[3,7,300,50], J4=[5,9,200,100], J5=[12,25,50,50]. FIG. 4 illustrates the application of a generalized geometrical algorithm involving an auxiliary resource q=0.5 q1+0.5 q2 with the hierarchical order {q,q1,q2}. The first column, represented by graphs 402 and 408, generally illustrates the optimization for q. The second column, represented by graphs 404 and 410, illustrates an optimization for q1 given the optimized values of q. The third column, represented by graphs 406 and 412, illustrates an optimization for q2. It is clear that modified allowed windows become narrower and can even collapse into a point upon introduction of constraints from the higher member(s) of hierarchy.

Note that in FIG. 4, geometrical algorithm solutions are indicated, along with conventional takt-time results. The "quasi-Pareto" front calculated with this method is generally displayed in FIG. 5 and compared with the true Pareto solution derived by the exact LP approach as well with the takt-time result. The end points of the Pareto front calculated by the two methods coincide. The solution obtained with the geometrical method comprises a good approximation of an exact result. Of course, both methods yield the minimal resource capacities that are substantially lower than the takt-time results.

Figure 5:
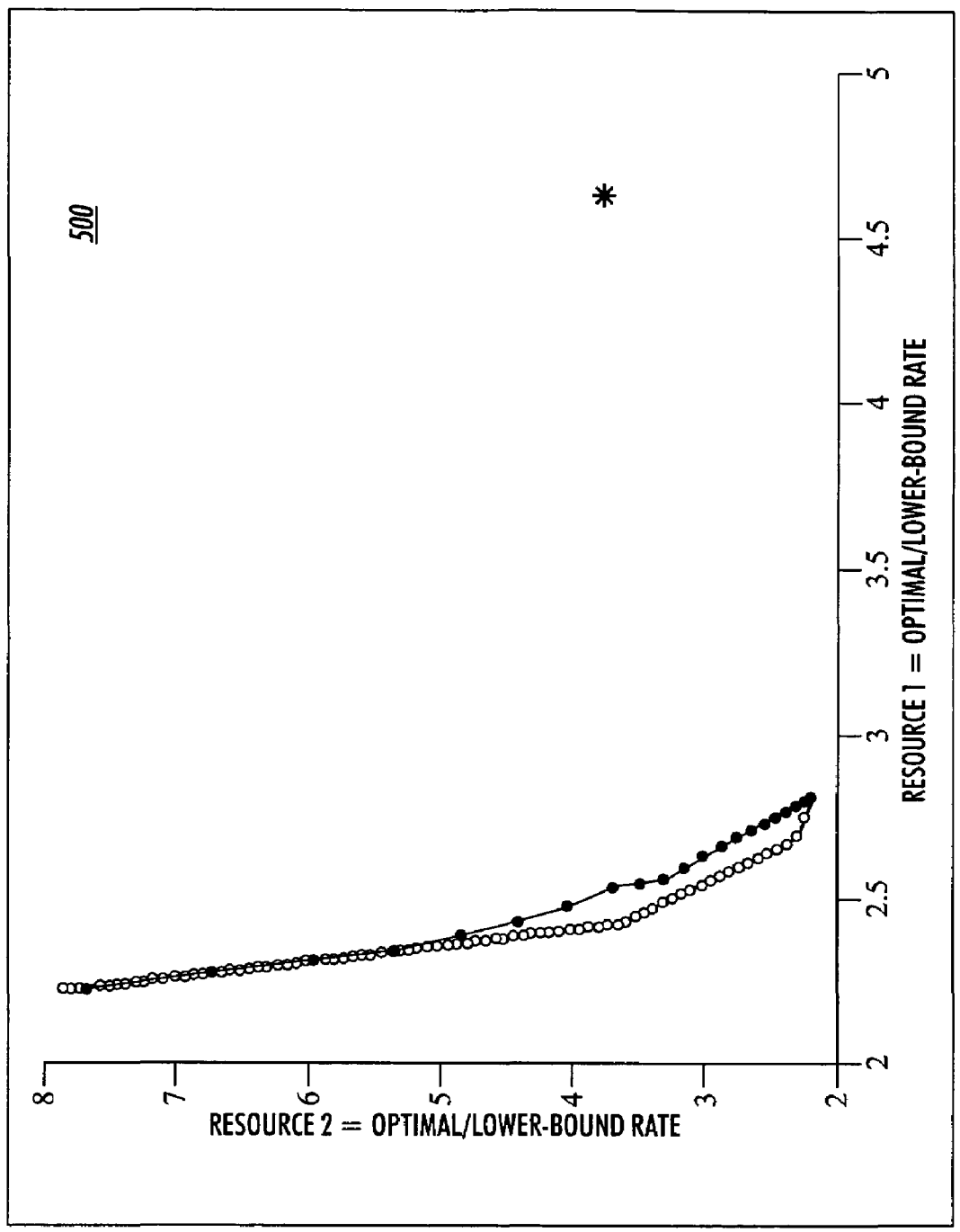
FIG. 5 illustrates a graph of a comparison of Pareto and quasi-Pareto fronts, in accordance with alternative embodiment of the present invention.
Figure 6:
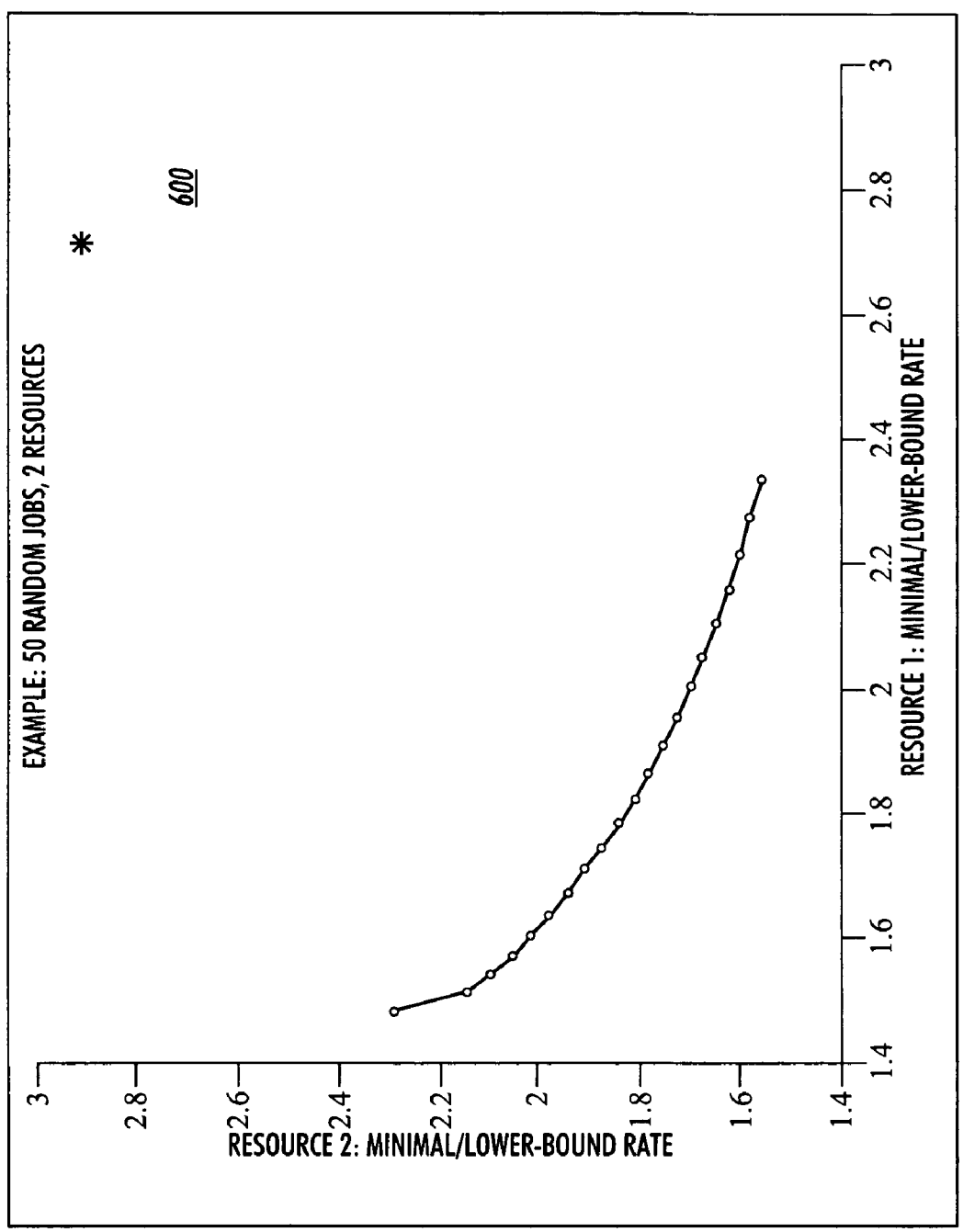
FIG. 6 illustrates a graph of a quasi-Pareto curve obtained with a geometrical algorithm, in accordance with alternative embodiment of the present invention

Note that in graphs 500 and 600, respectively, of FIGS. 5 and 6, the production rates are displayed normalized, with respect to the average values of the corresponding resource rates. These average rates can provide the lowest possible values of the minimal capacities. That is, in the absence of demand fluctuations, the minimal capacity would be equal to 1 for all resources. Significant deviations of the derived results from value 1 indicate how important the fluctuations are, and how much excess capacity they require from a print shop.

In a final example (3), consider the case of 50 randomly generated jobs that require independent random amounts of the 2 resources $q_{jr}$=50+md*100, where the value md represents a random number uniformly distributed between 0 and 1. The jobs are provided with random lengths $t_{i2}-t_{i1}$=5+md*10, and the job inter-arrival time is also random: $t_{i+1,1}-t_{i1}$=md*10. Graph 600 of FIG. 6 generally displays a quasi-Pareto curve obtained with a geometrical algorithm, which is a substantial improvement over the takt-time calculation is evident.

Based on the foregoing, it can be appreciated that methods and systems are disclosed for analyzing a job that is handled (or planned to be handled) by a print shop to evaluate the minimal capacities of various resources required for all the jobs to be completed on time in a lean (document) production environment. This approach casts the problem of minimal capacities for multiple resources as a multi-objective optimization problem.

Solutions can therefore be derived via a linear programming route (i.e., exact) or via a more efficient geometrical algorithm (generally approximate). Both solutions typically show significant improvements over the conventional takt-time calculation. By utilizing such methods and systems in accordance with embodiments of the present invention, a (print) shop can evaluate how much equipment is required to satisfy balanced lean (document) production at the lowest equipment cost.

The approach also can provide implications for print shop production control. There is an implication of this approach/calculation for the (print) shop control policy. It is apparent that the method tries to find most relaxed demand fluctuations. One interpretation of the found peak demand rate is that it establishes the measure of the production rate the print shop should maintain in anticipation of the future demand fluctuations.

Note that it may not be economic to always run the print shop at a full available capacity. Running the print shop merely to meet the current demand, as suggested by the unrelaxed solution, may be dangerous because of the possibility of high demand fluctuation that would require unavailable extra capacity to handle the fluctuation. One could draw a parallel here with the so-called "hedging point" control policy, which establishes the production rate to hedge against machine failures (i.e., "in anticipation of failures"). In the present embodiment, the production rate can be established to hedge against demand fluctuations. Of course, if an extra capacity is available, the hedging production rate could be a fraction of the relaxed peak demand.

It should be understood that the evaluation of minimal capacities as explained herein with respect to particular embodiments, assumes an "ideal" lean production and requires an adequate control policy. Deviations from ideal require some excess capacities for compensation. The same qualification would be as valid for the takt-time calculation also assuming an ideal lean production. Both LP (Linear Programming) and generalized geometrical algorithms can be implemented via a module or group of modules, as defined herein.

Examples of suitable modules include a calculation module(s) for automatically calculating minimal resource capacities of the production environment based on an estimation of at least one peak-demand production rate via the estimation module, thereby determining resource capabilities. Another example of a suitable module is an estimation module for estimating one or more peak-demand production rates of the production environment. The estimation module estimates the peak-demand production rate in response to evaluating jobs.

It is appreciated that various other alternatives, modifications, variations, improvements, equivalents, or substantial equivalents of the teachings herein that, for example, are or may be presently unforeseen, unappreciated, or subsequently arrived at by applicants or others are also intended to be encompassed by the claims and amendments thereto.

The invention claimed is:

1. A method for determining resource capabilities in a production environment, said method comprising:

initially evaluating a plurality of jobs within a production environment;

estimating at least one peak-demand production rate associated with said production environment, in response to evaluating said plurality of jobs; and thereafter automatically calculating minimal resource capacities of said production environment based on estimating said at least one peak-demand production rate by identifying at least one achievable region and at least one un-achievable region and thereafter calculating at least one Pareto optimal solution in response to identifying at least one achievable region and at least one un-achievable region, thereby determining resource capabilities thereof.

2. The method of claim 1 wherein said production environment comprises a printing environment.

3. The method of claim 2 wherein said printing environment comprises a print shop.

4. The method of claim 1 wherein said plurality of jobs comprises a plurality of printing jobs.

5. The method of claim 1 wherein said printing environment comprises a print lob, said plurality of lobs comprises a plurality of printing jobs, and said production environment comprises a printing environment.

6. The method of claim 1 wherein calculating minimal resource capacities of said production environment, further comprises:

calculating minimal resource capacities of said production environment based on a linear programming (LP) analysis.

7. The method of claim 1 wherein calculating minimal resource capacities of said production environment, further comprises:

calculating minimal resource capacities of said production environment based on a generalized geometrical algorithm.

8. The method of claim 1 wherein said production environment comprises a lean document production environment.

9. The method of claim 1 wherein calculating minimal resource capacities of said production environment, further comprises:

calculating minimal resource capacities of said plurality of resources of said production environment based on a multi-objective optimization thereof.

10. A method for determining minimal resource capabilities in a printing environment, said method comprising:

initially evaluating a plurality of printing jobs within a printing environment, wherein said printing environment comprises a print shop;

estimating at least one peak-demand production rate associated with said printing environment, in response to evaluating said plurality of printing jobs; and thereafter automatically calculating minimal resource capacities of said plurality of resources of said printing environment based on a multi-objective optimization thereof and estimating said at least one peak-demand production rate and a multi-objective optimization thereof, thereby determining minimal resource capabilities thereof.

11. A system for determining resource capabilities in a production environment, said system comprising:

a plurality of jobs evaluated within a production environment;

estimation module for estimating at least one peak-demand production rate associated with said production environment, wherein said estimation module estimates said at least one peak-demand production rate in response to evaluating said plurality of jobs; and calculation module for automatically calculating minimal resource capacities of said production environment based on an estimation of at least one peak-demand production rate via said estimation module, wherein said calculation module comprises at least one calculation module among a plurality of varying calculation modules for automatically calculating minimal resource capacities of said production environment, thereby determining resource capabilities thereof.

12. The system of claim 11 wherein said production environment comprises a printing environment.

13. The system of claim 12 wherein said printing environment comprises a print shop.

14. The system of claim 11 wherein said plurality of jobs comprises a plurality of printing jobs.

15. The system of claim 11 wherein said calculation module identifies at least one achievable region and at least one un-achievable region and thereafter calculates at least one Pareto optimal solution in response to identifying at least one achievable region and at least one un-achievable region.

16. The system of claim 11 wherein said calculation module calculates minimal resource capacities of said production environment based on a linear programming (LP) analysis.

17. The system of claim 11 wherein said calculation module calculates minimal resource capacities of said production environment based on a generalized geometrical algorithm.

18. The system of claim 11 wherein said production environment comprises a lean document production environment.

19. The method of claim 11 wherein said calculation module calculates minimal resource capacities of said plurality of resources of said production environment based on a multi-objective optimization thereof.

20. The method of claim 11 wherein said production environment comprises a lean document production environment and wherein said calculation module calculates minimal resource capacities of said plurality of resources of said production environment based on a multi-objective optimization thereof.

* * * * *